(12) United States Patent
Nakagawa et al.

(10) Patent No.: US 8,377,535 B2
(45) Date of Patent: Feb. 19, 2013

(54) PRESSURE-SENSITIVE ADHESIVE SHEET WITH RELEASE LINER

(75) Inventors: Yoshio Nakagawa, Ibaraki (JP); Hiroichi Ukei, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/429,619

(22) Filed: Apr. 24, 2009

(65) Prior Publication Data
US 2009/0274858 A1    Nov. 5, 2009

(30) Foreign Application Priority Data
Apr. 30, 2008   (JP) ................................. 2008-118984

(51) Int. Cl.
  *B32B 33/00*    (2006.01)
  *B32B 27/00*    (2006.01)
  *B32B 3/00*    (2006.01)
(52) U.S. Cl. ...... 428/41.8; 428/40.1; 428/141; 428/220; 428/343; 428/354
(58) Field of Classification Search .................. None
See application file for complete search history.

(56) References Cited

U.S. PATENT DOCUMENTS

| | | | | |
|---|---|---|---|---|
| 5,716,698 | A * | 2/1998 | Schreck et al. | 428/323 |
| 6,090,482 | A * | 7/2000 | Kawashima et al. | 428/353 |
| 6,395,360 | B1 * | 5/2002 | Takahira et al. | 428/40.1 |
| 6,506,490 | B1 * | 1/2003 | Yamamoto | 428/343 |
| 7,390,544 | B2 | 6/2008 | Nonaka et al. | |
| 7,897,226 | B2 | 3/2011 | Suzuki | |
| 2003/0077423 | A1 * | 4/2003 | Flanigan et al. | 428/166 |
| 2003/0178124 | A1 | 9/2003 | Mikami et al. | |
| 2006/0019069 | A1 | 1/2006 | Ikishima et al. | |
| 2008/0081143 | A1 * | 4/2008 | Ukei et al. | 428/41.8 |
| 2008/0220196 | A1 * | 9/2008 | Ukei et al. | 428/41.8 |

FOREIGN PATENT DOCUMENTS

| | | |
|---|---|---|
| CN | 1664041 A | 9/2005 |
| CN | 101148568 A | 3/2008 |
| EP | 1 595 927 A1 | 11/2005 |
| EP | 1 903 082 A1 | 3/2008 |

(Continued)

OTHER PUBLICATIONS

Japanese Patent Office, Notice of Reasons for Refusal in Japanese Patent Application No. 2008-118984 (Oct. 18, 2012).

(Continued)

*Primary Examiner* — Callie Shosho
*Assistant Examiner* — Cheng Huang
(74) *Attorney, Agent, or Firm* — Leydig, Voit & Mayer, Ltd.

(57) ABSTRACT

Provided is a release-lined pressure-sensitive adhesive sheet comprising a release liner 10 and a pressure-sensitive adhesive sheet 20. The release liner 10 has an average linear expansion coefficient of at most $7 \times 10^{-5}/°$ C. between 25° C. and 40° C. A layer 12 to constitute a surface 10A on the pressure-sensitive adhesive layer side of the release liner 10 is formed of a polyolefin-based resin composition containing none or at most 0.01 mass % of a phosphorous-based antioxidant. The surface 10A is divided into a plurality of sections 124 by a plurality of ridges 2A and 2B with each ridge having a height of 5 μm to 50 μm. At least one of the sections 124 inscribes a circle of a diameter greater than 500 μm.

19 Claims, 4 Drawing Sheets

FOREIGN PATENT DOCUMENTS

| | | |
|---|---|---|
| JP | 05-117603 A | 5/1993 |
| JP | 2004-149811 A | 5/2004 |
| JP | 2006-028416 A | 2/2006 |
| JP | 2006-116718 A | 5/2006 |
| JP | 2007-070401 A | 3/2007 |
| WO | WO 98/29516 A1 | 7/1998 |
| WO | WO 02/13980 A1 | 2/2002 |
| WO | 2005/100499 A1 | 10/2005 |

OTHER PUBLICATIONS

State Intellectual Property Office of the People's Republic of China, Office Action in Chinese Patent Application No. 200910137931.5 (Dec. 27, 2012).

\* cited by examiner

PRESSURE-SENSITIVE ADHESIVE SHEET WITH RELEASE LINER

BACKGROUND OF THE INVENTION

1. Field of the Invention

The present invention relates to a release-lined pressure-sensitive adhesive (PSA) sheet comprising a PSA layer and a release liner provided thereon. In particular, it relates to a PSA sheet with a release liner, wherein the release liner is provided on the PSA layer side with a plurality of ridges.

This application claims priority based on Japanese Patent Application No. 2008-118984 filed on Apr. 30, 2008 and the entire content of the application is incorporated herein by reference.

2. Description of the Related Art

PSA sheets for applications such as paint-replacements, decorations, surface-protections, etc for vehicle exteriors, housing materials and so on are generally applied to cover a large surface area and required to have aesthetic quality as well. A known technology prevents degradation in the exterior appearance of PSA sheets caused by bubbles trapped upon its application onto an adherend, by releasing fluids (typically, a gas such as air, etc) to the outside through channels pre-formed on the applied PSA layer surface. Examples of documents describing these PSA sheets include Japanese Patent Application Publication Nos. 2004-149811, 2006-028416 and 2007-070401.

In a preferred method for forming channels on a PSA layer surface, surface structures of a release liner to protect the PSA layer until the PSA sheet is applied (to an adherend) are transferred. For the release liner having a surface structure to press channels (a surface structure having ridges corresponding the channels), in terms of the surface molding (structuring) facilitation, at least the structured surface side of the liner is formed of a polyolefin-based resin composition (typically, a polyethylene-based resin composition).

SUMMARY OF THE INVENTION

In order to release air from the PSA sheet, it is advantageous to form many channels (air release channels) by shortening the distance between adjacent channels. For instance, Japanese Patent Application Publication No. 2004-149811 describes that air release is secured by limiting the surface structure of the PSA layer so as to include channels with a prescribed combined total volume per 500-μm circle. However, because the PSA layer does not come in tight contact with an adherend at these channels, shortening of the interchannel distance (the channel pitch) results in fragmentation of the PSA layer surface in tight contact with the adherend (bonding surface). Also, shortening of the interchannel distance (i.e. increasing the number of channels per unit area) leads to a decrease in the total bonding surface (net bonding area). Fragmentation of or a decrease in the bonding surface may lower the adhesive performance (e.g., at least either one of the adhesiveness to a curved surface and the peel strength) of the PSA sheet.

An objective of the present invention is to provide a release-lined PSA sheet that allows efficient release of air without excessive fragmentation of the bonding surface The present invention provides a release-lined PSA sheet comprising, a PSA sheet comprising a substrate and a PSA layer retained (backed) by the substrate, and a release liner placed on the PSA layer. The release liner has a laminate configuration comprising at least a face layer A to form its PSA layer side surface and a support layer B to support the layer A. The layer A is formed of a polyolefin-based resin composition. The polyolefin-based composition contains no phosphorous-based antioxidant or at most about 0.01 mass % of the same. The surface on the PSA layer side of the liner is divided into a plurality of sections by a plurality of ridges extending across the surface. The ridge may typically have a height of about 5 μm to 50 μm. At least one (possibly, essentially all) of the sections is such that the section inscribes a circle of a diameter greater than 500 μm (for instance, above 500 μm, but less than or equal to 1500 μm). In other words, of the plurality of sections, at least some are large enough for a circle of 500 μm diameter to fit inside its outer rim. The release liner has an average linear expansion coefficient of about $7 \times 10^{-5}/°$ C. or less (typically about $1 \times 10^{-5}$ to $7 \times 10^{-5}/°$ C.) at a temperature between 25° C. and 40° C.

Since the release liner to constitute the release-lined PSA sheet has an average linear expansion coefficient of at most the prescribed value between 25° C. and 40° C., the surface structure (such as the pitch or the cross section of the ridge) of the liner is not highly temperature dependent. Thus, the application temperature of the release-lined PSA sheet (i.e., the temperature at which the release liner is removed from the PSA sheet and the resulting sheet is adhered to an adherend) does not significantly alter the channel structure of a PSA layer. Therefore, without making the individual bonding area framed by the channels (corresponding to the sections divided by the ridges on the PSA layer side of release liner) too small, efficient air release (workability) can be ensured over a wide range of temperatures. The release-lined PSA sheet disclosed herein brings about greater adhesive performance because of the plurality of sections, with at least one (some) of them having a prescribed-sized area. That the release liner has a small average linear expansion coefficient value is advantageous for decreasing the dependence of the application size of the PSA sheet on the application temperature of the release-lined PSA sheet (i.e., for increasing the size stability against the temperature of the application environment). It facilitates, over a wide range of application temperatures, bonding of the PSA sheet to fit in a predetermined-sized area.

Of the release liner, layer A to constitute the PSA layer side is formed of a polyolefin-based resin composition containing either none or only a minute amount of phosphorous-based antioxidant. Therefore, in a release liner prepared by treating the PSA layer side with a release agent (for instance, an addition-cure-type silicone-based release agent, especially the one containing a platinum catalyst), the release agent can be efficiently cured. This brings about at least one of the following effects: reduction of thermal stress during the release treatment to lead to higher precision in the surface structure, reduction of the amount of remaining uncured release agent to increase the adhesive performance (e.g., adhesiveness to a curved surface) of the PSA sheet, and properly adjusted releasing ability of the release liner for removal from the PSA sheet (typically, prevention of an excessive increase in the releasing ability caused by insufficient curing of the release agent).

In a preferred embodiment of the release-lined PSA sheet disclosed herein, of the release liner, at least the PSA layer side surface (i.e., the surface of layer A) is treated with a addition-cure-type silicone-based release agent containing a platinum catalyst (hereinafter, may be referred to as a "prescribed release agent"). While the prescribed release agent is curable at a relatively low temperature, depending on the composition of the treated surface, the curing of the release agent can be inhibited. In the technology disclosed herein, of the release liner, layer A to be treated with the release agent is formed of a polyolefin-based resin composition containing none or only a minute amount of phosphorous-based antioxidant. This suppresses the inhibition of curing of the prescribed release agent so that its excellent low-temperature curing nature can be brought about to the full extent. As a result, the release treatment can be carried out in an embodiment with less thermal stress (at a low temperature and/or over a short time) to obtain a release liner having a precise surface structure (with less heat-caused distortion) on the PSA layer side. Transferring this surface structure to a PSA layer forms well-defined grooves on the PSA layer. These well-defined grooves efficiently form air release channels upon application of the PSA sheet. Therefore, without excessively reducing the size of bonding area of each individual section, air can be smoothly released to the outside through the grooves (channels running through edges of the PSA layer). The release-lined PSA sheet disclosed herein can bring about excellent adhesive performance (e.g., adhesiveness to a curved surface) because at least one of the sections is as large as a prescribed-sized area (i.e., having a larger continuous bonding area). Moreover, because it efficiently cures the prescribed release agent, the release agent can be sufficiently cured (i.e., the amount of uncured release agent can be reduced) without applying excessive thermal stress for the release treatment. This can increase the performance of the PSA sheet. The releasing ability required to release the PSA sheet from the release liner can be adjusted more adequately.

In a preferred embodiment, the plurality of ridges formed on the PSA layer side of the release liner comprises a first group of ridges extending in parallel to each other and a second group of ridges extending in parallel to each other while intersecting the first group of ridges (i.e., extending in a different direction from the first group). In this embodiment, first and second groups of grooves are formed on the PSA layer, corresponding to the first and second groups of ridges; and these grooves provides efficient air release for application of the PSA sheet.

Ridges in the first and second groups are preferred to have an interval between two adjacent ridges exceeding about 500 μm (for instance, greater than 500 μm, but smaller than 1500 μm) when measured at the bottoms. When the PSA sheet comprises grooves corresponding to ridges in such a pattern, more even (well-balanced) air release and adhesive performance can be provided.

Each ridge has a width of for example, about 15 μm to 200 μm at the bottom. When the PSA layer comprises grooves corresponding to ridges having such a structure (i.e., when grooves of the PSA layer have openings as wide as the bottom widths of the ridges), appropriate air release and adhesive performance can be both brought about.

In the release-lined PSA sheet disclosed herein, examples of preferred material for layer B (a support layer) to constitute the release liner include paper, polyethylene phthalate (PET) resin, and the like. Layer B formed of such material is suitable as a component of a release liner having an average linear expansion coefficient of at most about $7 \times 10^{-5}/°C$. when laminated with layer A. A release-lined PSA sheet comprising this release liner is preferred because the PSA sheet is less susceptible to a size change by the application temperature (the size stability is high).

In a preferred embodiment of the release liner of the technology disclosed herein, layer A is formed of the above-mentioned polyolefin-based resin composition and is laminated on at least a first side of layer B. Release liners having this configuration can be produced efficiently. For instance, in a co-extruded laminate wherein a heat-melted polyolefin-based resin composition is extruded into a layer (film) to coat the surface of layer B, by embossing a prescribed pattern to the extrusion in solidification by cooling, layer A provided with a surface structure corresponding to the pattern can be formed. Alternatively, the extrusion can be solidified by cooling to form a polyolefin-based resin composition layer having a flat surface; and subsequently, a prescribed pattern can be embossed to the surface to provide a surface structure. The polyolefin-based resin composition can be molded solely to form a polyolefin-based resin film with a flat surface; and while or after laminating the film and layer B, embossing can be carried out to provide a prescribed surface pattern.

DETAILED DESCRIPTION OF THE INVENTION

Hereinafter, preferred embodiments according to the present invention will be described. The matter which is other than that specifically referred to in this specification, but is necessary for carrying out the present invention, may be understood as a matter of design choice for those skilled in the art based on the conventional art. The present invention can be carried out based on the contents disclosed in this specification and the technological common knowledge in the art.

The release-lined PSA sheet disclosed herein comprises, a PSA sheet comprising a substrate and a PSA layer retained by the substrate, and a release liner placed over the PSA layer. The PSA sheet may have a PSA layer on a first side of a substrate sheet (support) or may have a PSA layer on either side of the substrate. The concept of the PSA sheet here may include so-called PSA tapes, PSA labels, PSA films, etc.

Though not particularly limited to, the release liner to constitute the release-lined PSA sheet has a thickness of, for instance, about 50 μm to 500 μm (when measured from the top of the ridge; i.e., the thickness includes the height of the ridge). The release liner is preferred to have a thickness of about 50 μm to 300 μm (for example, about 100 μm to 300 μm)

Figure 1:
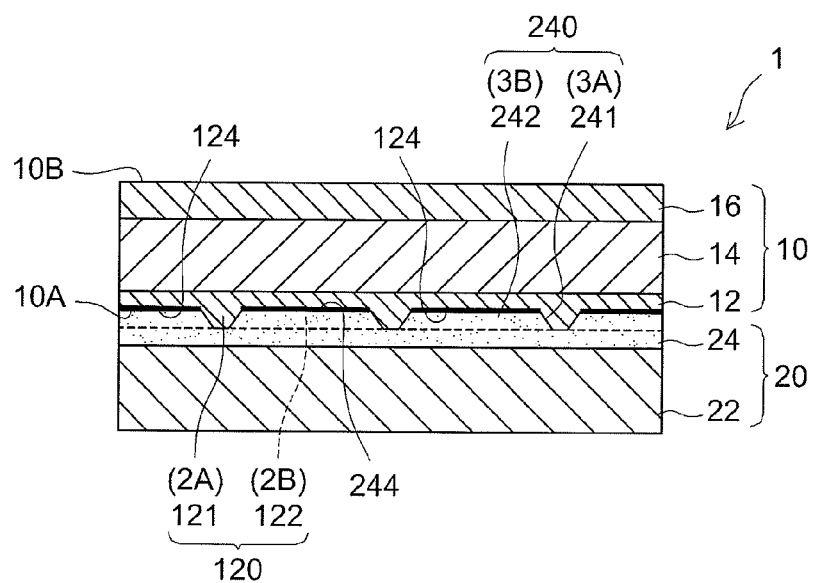
FIG. 1 shows a cross section schematically illustrating a configuration of the release-lined PSA sheet.

The release-lined PSA sheet disclosed herein, may have a cross section schematically illustrated in FIG. 1. The release-lined PSA sheet shown in FIG. 1 comprises a PSA sheet 20 comprising a substrate 22 and a PSA layer 24 provided to a first side of the substrate, and a release liner 10 placed on the PSA layer 24.

The release liner 10 is a laminate comprising at least a face layer 12 (layer A) and a support layer 14 (layer B) to support the layer A. The release liner 10 exemplified in FIG. 1 has a triple-layer configuration wherein the back side (i.e., opposite to the face layer side) of the support layer 14 is provided with a back layer 16. The face layer 12 is formed of a polyolefin-based resin composition that satisfies prescribed conditions.

Figure 2A:
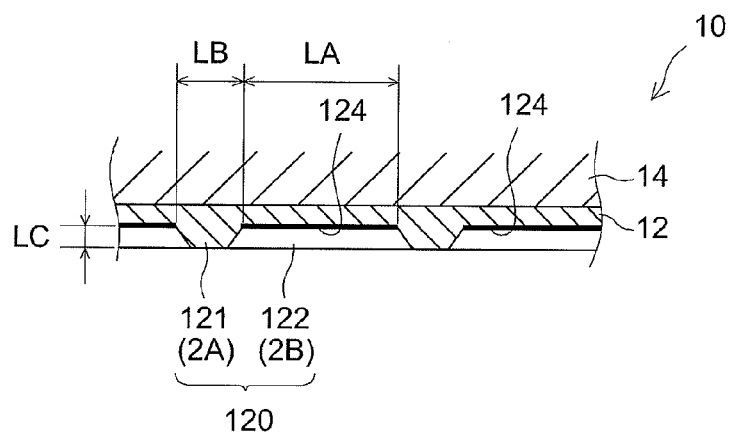
FIG. 2A shows a cross section of a fragment of a release liner schematically illustrating structural parts for physical measurements.
Figure 2B:
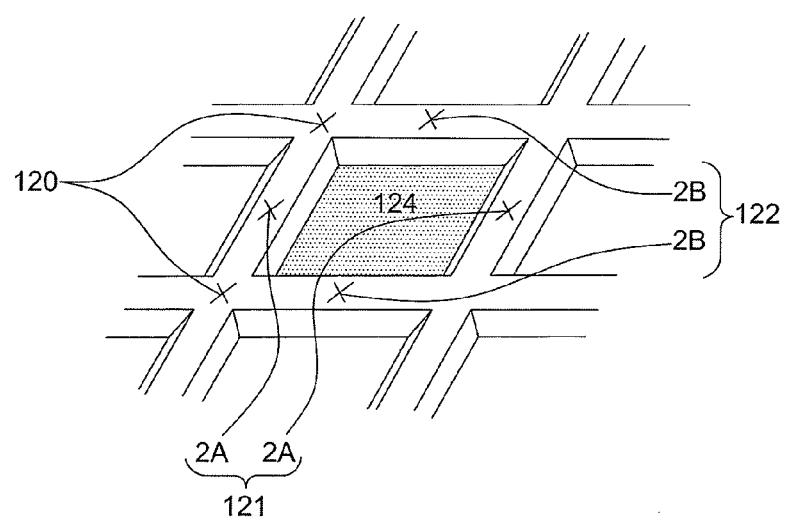
FIG. 2B shows a perspective view of the release liner of FIG. 2A illustrating the structural detail of the release liner.

The release liner 10 has a front face 10A on the PSA layer side. The front face 10A is provided with a first ridge group 121 comprising a plurality of ridges 2A linearly extending in a direction (vertical to the plane of FIG. 1), and a second ridge group 122 comprising a plurality of ridges 2B linearly extending and orthogonally crossing the ridges 2A (from left to right of FIG. 1). Ridges 2A are in parallel to each other, separated at a prescribed pitch. Ridges 2B are also in parallel to each other, separated at a prescribed pitch. The pitch of ridges 2A is typically about equal to that of ridges 2B. Ridges 2A and 2B communicate at intersections to form a grid protrusion 120 as a whole. In other words, the front face 10A of the release liner 10 are divided into a grid pattern by the first and second ridge groups 121 and 122. Thus, a plurality of sections 124 framed by ridges 2A and 2B are formed. The plurality of sections 124 are represented by bold lines in FIG. 2A and shading in FIG. 2B. The front face 10A is releasable. Typically, the front face 10A is treated with a release agent (the above-mentioned prescribed release agent in a preferred embodiment).

The release liner 10 has a back face 10B, which may be flat or, as necessary, provided entirely or partially with the same structure as the front face 10A or with a different structure. The back face 10B may not be release-treated or may be releasable as necessary, treated with the prescribed release agent or by any other method (a release agent other than the prescribed one may be used in the method).

The PSA layer 24 constituting the PSA sheet 20 is provided on a first surface with a first groove group 241 comprising a plurality of grooves 3A and a second groove group 242 comprising a plurality of grooves 3B linearly extending and orthogonally crossing the grooves 3A, corresponding to the structure of the front face 10A. Grooves 3A and 3B communicate to form a grid recess 240 as a whole. The squares framed by grooves 3A and 3B are relatively raised initial adhesive area (bonding area) 244.

When the release liner 10 is removed from the PSA sheet of this configuration so as to expose the PSA layer 24 having the grid recess 240 and the PSA layer 24 is bonded to an adherend by applying appropriate pressure, the initial adhesive areas 244 are tightly bonded to the adherend while air release channels (fluid pathways) crisscrossing between the grid recess 240 and the adherend are formed. Through these channels, the air trapped upon application of the PSA sheet 20 can be eliminated to the outside.

Here, if the surface structure (for instance, one, two or more of structural features such as cross section dimensions of ridge 2A, those of ridge 2B, their linearity, continuous extent, pitch, etc.) of the release liner 10 is deformed from its prescribed structure (designed structure), the deformation will be reflected in the structures of grooves 3A and 3B. As a result, air release channels may be partially narrower than designed, or the channels may be altered in the shape along the length, thereby to hinder the smooth air flow to the outside and further to cut off (clog up) the channels leaving some grooves ineffective in eliminating the trapped air. This phenomenon decreases the efficiency of the grooves as air release channels and even reduce the air releasing ability of the PSA sheet. When the PSA layer is formed of a soft PSA or when the PSA sheet is used at a relatively high surrounding temperature (for instance, at 35° C.), the reduction in the air releasing ability due to deformation will be especially significant.

In the release-lined PSA sheet of the present invention, by using the release liner 10 suitable for formation of a precise surface structure, grooves 3A and 3B are precisely formed on the PSA layer and thus can function as air release channels more efficiently (without much loss of effectiveness). Hence, without excessive fragmentation of the bonding area 244, excellent air release is possible.

In the technology disclosed herein, the layer (layer A) constituting the PSA layer side surface of the release liner is formed of a polyolefin-based resin composition containing none or at most about 0.01 mass % of a phosphorous-based antioxidant. Here, the polyolefin-based resin composition comprises a base polymer (primary polymer component) of a polymer formed primarily of an olefin (primary monomer component). The olefin-based polymer may be, for instance, a homopolymer formed of an α-olefin having 2 to 10 carbon atoms or a co-polymer formed primarily of the same.

The polyolefin-based resin composition to constitute layer A may be, for instance, a polypropylene-based resin (PP resin) composition comprising a base polymer of a propylene-based polymer. Here, the concept of "propylene-based polymer" includes all of homopolymers of propylene (homopolypropylenes, typically isotactic polypropylenes); and co-polymers of propylene and another olefin (for instance, one, two or more kinds selected from α-olefins having 2 and 4 to 10 carbon atoms) and/or a monomer other than an olefin. The co-polymers may be random co-polymers (random polypropylenes) or block co-polymers. Alternatively, it may be a PP resin composition containing at an arbitrary ratio two or more kinds of propylene-based polymers (for instance, a combination of a homopolypropylene and a random polypropylene, a combination of two random polypropylenes with different co-polymerization compositions, etc.).

The polyolefin-based resin composition to constitute layer A may be a polyethylene-based resin (PE resin) composition comprising a base polymer of an ethylene-based polymer. The ethylene-based polymer may be homopolymers of ethylene; and co-polymers of ethylene and another olefin (for instance, one, two or more kinds selected from α-olefins having 3 to 10 carbon atoms) and/or a monomer other than an olefin (for instance, one, two or more kinds selected from ethylenic unsaturated monomers such as vinyl acetate, acrylic acid, methacrylic acid, methyl acrylate, ethyl acrylate, etc.). The co-polymers may be random co-polymers (random polyethylenes) or block co-polymers. As for the ethylene-based polymer, can be used any of so-called low density polyethylene (LDPE), linear low density polyethylene (LLDPE), high density polyethylene (HDPE) and the like.

The polyolefin-based resin composition may comprise as necessary an optional polymer component besides the base polymer (preferably, a propylene-based or ethylene-based polymer). The optional polymer component can be various polymers compatible or incompatible with the base polymer. The amount of the optional polymer component to be contained (when two or more optional polymer components are contained, their combined amount) may be, for instance, relative to 100 parts by mass of base polymer, at most 70 parts by mass (typically, 0.1 to 70 parts by mass), preferably at most 50 parts by mass (typically, 0.1 to 50 parts by mass), more preferably at most 20 parts by mass (typically 0.1 to 20 parts by mass). The amount of optional polymer components may be, relative to 100 parts by mass of base polymer, at most 5 parts by mass (typically, 0.1 to 5 parts by mass). It may be a resin composition comprising no optional polymer components (for example, comprising one, two or more kinds of propylene-based polymers only or of ethylene-based polymers only).

In a preferred embodiment of the release liner disclosed herein, layer A is formed of a PP resin composition comprising an optional polymer component of an ethylene-based polymer (LDPE, typically LLDPE) in addition to a propylene-based polymer (e.g., a homopolypropylene). The amount of the ethylene-based polymer may be, for instance, relative to 100 parts by mass of propylene-based polymer, about 1 to 50 parts by mass (preferably about 5 to 20 parts by mass). For example, a preferred PP resin composition is a mixture of a propylene-based polymer and an ethylene-based polymer, containing essentially no other polymer components.

In general, PP resins are relatively more heat-resistant than PE resins. Thus, a release liner with layer A of a PP resin has an advantage such that thermal deformation caused by added heat (e.g., to about 145° C.) during release treatment can be greatly suppressed. On the other hand, a release liner with layer A of a PE resin has an advantage of great moldability for a prescribed surface structure (e.g., for embossing the structure). The effect of the present invention to increase the structural precision may be more evident in a release liner with layer A of a PE resin.

The polyolefin-based resin composition may comprise as necessary various components known as additives generally used for polyolefin-based resin compositions as long as the effects of the present invention are significantly compromised. Examples of these components include antioxidants, neutralizers, thermal-stabilizers, photo-stabilizers, UV absorbers, antistatic agents, slip agents, anti-blocking agents, colorants (pigments, dyes, etc.) and the like. For instance, the PP resin composition may contain about 5 to 20 parts by mass of a pigment such as $TiO_2$ relative to 100 parts by mass of propylene-based polymer.

As for the antioxidants, various known antioxidants can be used such as phenol-based, phosphorous-based (phosphite-based), sulfur-based, amine-based and so on. Examples of phenol-based antioxidants include mono-phenol antioxidants such as 2,6-di-t-butyl-4-methyl phenol, 2,6-di-t-butyl-4-ethyl phenol, etc.; bis-phenol antioxidants such as 2,2'-methylene-bis(4-methyl-6-t-butyl phenol), 2,2'-methylene-bis(4-ethyl-6-t-butyl phenol), 4,4'-butylidene-bis(3-methyl-6-t-butyl phenol), 4,4'-thio-bis(3-methyl-6-t-butyl phenol), etc.; high molecular weight phenol antioxidants such as 1,3,5-trimethyl-2,4,6-tris(3,5-di-t-butyl-4-hydroxybenzyl)benzene, tetrakis [methylene-3-(3',5'-di-t-butyl-4'-hydroxyphenyl)-propionate]methane, 1,1,3-tris(2-methyl-4-hydroxy-5-t-butylphenyl)butane, etc.; and the like. Examples of phosphorous-based antioxidants include tris(2,4-di-t-buthylphenylphosphite, tris(nonylphenyl)phosphite, triphenyl phosphite, di(stearyl)pentaerythritol diphosphite and the like. Examples of sulfur-based antioxidants include dilauryl-3,3'-thiodipropionate, dimyristyl-3,3'-thiodipropionate, distearyl-3,3'-thiodipropionate, pentaerythritol tetralauryl-thiopropionate and the like. Examples of amine-based antioxidants include phenyl-α-naphthylamine, diphenylamine and the like.

These antioxidants can be used solely or in combination of two or more kinds. It is noted, however, that when the polyolefin-based resin composition for layer A contains a phosphorous-based antioxidant (including when used in combination with other antioxidants), the amount of the phosphorous-based antioxidant contained in the composition should be at most 0.01 mass %. This is because when a surface formed of a polyolefin-based resin composition containing more phosphorous-based antioxidant than the above range is coated with release agent (especially, an addition-curing-type silicone release agent containing a platinum curing catalyst (prescribed release agent)), the phosphorous-based antioxidant may inhibit the curing of release agent. If the curing is inhibited (i.e., insufficient), the amount of uncured release agent is likely to increase. Uncured release agent may transfer into the PSA layer of release-lined PSA sheet thereby to result in undesired effects such as staining of the PSA sheet application subject (adherend). The transfer of uncured release agent into the PSA layer may unfavorably affect the adhesive performance (adhesiveness to a curved surface, adhesive strength, cohesiveness, etc.) as well. Moreover, the insufficient curing of release agent will result in poor liner release, requiring great force to remove the release liner from the PSA sheet (liner releasing force). In a release liner having ridges on the PSA layer side, or in a liner for a release-lined PSA sheet to be applied by a bonding device (bonding jig) described later with which removal of release liner from the PSA sheet and adhering of the PSA sheet to an adherent take place continuously, proper control of the liner-releasing force by suppressing the inhibition of release agent curing is especially significant.

To prevent the curing inhibition, the polyolefin-based resin composition for layer A is preferred to contain essentially no phosphorous-based antioxidant. However, in view of practical issues (cost, workability, etc.), can be preferably used as well a polyolefin-based resin composition containing phosphorous-based antioxidant in an amount that does not inhibit the curing significantly (at most about 0.01 mass %; for instance, 0.005 mass % or greater, but less than 0.01 mass %).

To prevent the curing inhibition, the polyolefin-based resin composition for layer A is preferred to contain none of phosphorous-based, sulfur-based, or amine-based antioxidants or to contain at most 0.01 mass % in their combined amount (typically, 0.001 to 0.01 mass %; for instance, 0.005 mass % or greater, but less than 0.01 mass %).

The polyolefin-based resin composition (e.g., a polypropylene-based resin composition) for layer A preferably contains essentially no nucleating agent (such as phosphate ester salts, carbonate ester salts, sorbitols, etc). This is because when a layer surface formed of a composition containing nucleating agent is coated with release agent (especially, the aforementioned prescribe release agent), the nucleating agent may inhibit the curing of release agent.

The PSA layer side surface has, for instance, a structure wherein a plurality of ridges (ridges in a group) extending in parallel are distributed at a pitch exceeding 500 μm (typically, greater than 500 μm, but smaller than or equal to 1500 μm) when measured at the bottoms of two adjacent ridges (i.e., the width of a section divided by adjacent ridges). The structure may comprise a first ridge group in which a plurality of ridges extend in parallel to each other (typically, in a linear fashion) and a second ridge group in which a plurality of ridges extend in parallel to each other (typically in a linear fashion) while intersecting the first group (vertically in typical). There may be third, fourth ridge groups and so on. When a release liner with this sort of a surface structure on the PSA layer side is used to constitute a release-lined PSA sheet, the surface structure will be transferred to the PSA layer to provide the PSA sheet with excellent air release. Alternatively, a PSA layer formed on this release liner can be transferred onto a substrate to form a PSA sheet with excellent air release.

Each ridge may have a cross section in various shapes such as rectangle, trapezoid (typically, with the upper side shorter than the lower side as shown in FIGS. 1 and 2), inverted V, inverted U, semicircle, etc. The ridge height (LC in FIG. 2) may be, for instance, about 5 μm to 50 μm. By making LC to about 15 μm to 50 μm (preferably about 20 μm to 50 μm; for instance, about 20 μm to 30 μm), can be obtained a PSA sheet that exhibits good air release. LC is preferred to be about equal to or smaller than the thickness of the PSA layer and is typically suitable to be about 30 to 90% (for instance, about 50 to 80%) of the thickness of the PSA layer.

Each ridge may have a width at the bottom (LB in FIG. 2) of, for instance, about 15 µm to 200 µm (preferably, about 20 µm to 150 µm; for instance, about 25 µm to 80 µm). Ridges may have cross sections (height, width, etc.) that are identical to or different from each other. For example, cross sections of all ridges may be essentially identical. Alternatively, ridges having cross section different from each other may be formed in a regular or random pattern. Two adjacent ridges in the ridge group have an interval at the bottoms (LA in FIG. 2) exceeding 500 µm, but at most 1500 µm in typical—for instance, about 550 µm to 1250 µm. LA may be about 600 µm or greater (typically, about 600 µm to 1250 µm) or about 800 µm or greater (typically about 800 µm to 1200 µm). When a plurality of ridge groups are provided intersecting each other, ridges of each ridge group may have a cross section identical to or different from each other. The pitch of ridges in each group may or may not be constant.

In a preferred embodiment, first and second ridge groups orthogonally-intersecting each other are provided to the entire area of the PSA layer side surface. The plurality of ridges in each group shares an identical cross section; and the first group ridges and the second group ridges share an identical cross section as well. The cross section generally is a trapezoid with the upper side shorter than the lower side. In particular, the trapezoid may have, for instance, a ridge height LC (height of the trapezoid) of about 15 µm to 50 µm (preferably 50 to 80% of the thickness of the PSA layer), a width LB at the bottom (lower side of the trapezoid) of about 25 µm to 80 µm, and a width LD at the top (upper side of the trapezoid) of about 1 µm to 50 µm (typically, about 3 µm to 30 µm while shorter than the lower side LB). The pitch of the first group ridges is about equal (typically, is equal) to that of the second group ridges, with each exceeding 500 µm, but less than or equal to 1500 µm. A release liner having such a surface structure can be used to constitute a release-lined PSA sheet with especially great air release. A PSA layer formed on a release liner with such a structure can be transferred to a substrate to produce a PSA sheet with especially great air release.

The release liner of the technology disclosed herein comprises layer B (support layer) to support the layer A (face layer). That the liner has a laminate configuration wherein layer B supports layer A is advantageous to bring about a plurality of properties (for instance, the average linear expansion coefficient and surface moldability of release liner) in a good balance. The support layer is preferred to have an average linear expansion coefficient between 25° C. and 40° C. that is smaller than that of the face layer Since the polyolefin-based resin composition to constitute the face layer has an average linear expansion coefficient generally greater than $7\times10^{-5}/°$ C., the coefficient of the support layer is preferred to be smaller than $7\times10^{-5}/°$ C. (typically, about $1\times10^{-5}$ to $6\times10^{-5}/°$ C.; for instance, about $1\times10^{-5}$ to $3.5\times10^{-5}/°$ C.) so as for the entire release liner constituted with the face and support layers to have an average linear expansion coefficient of at most about $7\times10^{-5}/°$ C. (more preferably at most about $5\times10^{-5}/°$ C.; typically about $1\times10^{-5}$ to $5\times10^{-5}/°$ C.)

As for the support layer, for instance, can be preferably used high-grade paper, glassine paper, rice paper (washi), kraft paper, etc. Of them, desirable are high-grade paper and glassine paper. Suitable other examples include polyester resins (resin containing a base polymer of polyester) such as polyethylene phthalate, polyethylene naphthalate, etc. Of them, polyethylene phthalate-based resin (PET) is preferred for forming the support layer.

The release liner may have a bi-layer configuration composed of a face layer and a support layer. A release liner having this type of configuration is easy to produce because of the simple structure and is advantageous in terms of material costs. The release liner may contain one, two or more layers in addition to the face and support layers. For instance, as shown in FIG. 1, it may be a release liner 10 with a triple-layer configuration wherein a support layer 14 is provided with a face layer 12 on one side and a back layer 16 on the other side. Release liner 10 having this sort of configuration is preferred because (warping) curling due to humidity changes and so on is less likely to occur. When the support layer 14 is of paper, the configuration comprising a back layer 16 is especially effective.

To form back layer 16, may be used a thermoplastic resin such as polyolefin-based or polyester-based resins and so on. For instance, the back layer 16 is preferred to have an average linear expansion coefficient that is about the same as that of the face layer 12. This provides an effect of suppressing the warping of release liner 10 due to temperature changes, etc. This effect can be brought about whether the support layer 14 is made of paper or resin such as PET, etc. For example, the back layer 16 is preferred to be formed of a polyolefin-based composition containing a base polymer of the same olefin-based polymer as the face layer 12 (polyethylene-based resin, polypropylene-based resin, etc). A preferred polyolefin-based resin composition to form the back layer 16 may contain essentially no phosphorous-based antioxidant; or may contain at most 0.01 mass % of the same or more than 0.01 mass % of the same. A preferred polyolefin-based resin composition to form the back layer 16 may or may not contain a nucleating agent. In view of productivity, release liner 10 comprising face layer 12 and back layer 16 formed of the same polyolefin-based resin composition.

The thickness of support layer 14 and that of optionally-included back layer 16 are not particularly limited and can be appropriately selected in accordance with the total thickness and surface composition (thickness, material, etc) of release liner 10 so that the average linear expansion coefficient of the release liner 10 as a whole be within the range described above.

For the release agent, various known release agents can be used such as silicone-based, fluorine-based, long-chain alkyl-based, fatty acid amide-based, silica powder, etc. An example of preferred release agents in this invention is heat-curable silicone-based release agent. As for the heat-curable release agent, any of addition-curable and condensation-curable types can be used, but an addition-curable type is preferred. In this type of release agent, a platinum (Pt) or rhodium (Rh) catalyst is used in general as the curing catalyst. In terms of curing efficiency, a platinum catalyst is more preferably used.

In a preferred embodiment, for the release agent, an addition-curable type silicone-based release agent containing a platinum catalyst (i.e., prescribed release agent) is used. With the prescribed release agent and further with that the surface (face layer) treated with the release agent contains none or a minimal amount of a phosphorous-based antioxidant (curing inhibitor), the release agent can be adequately cured even under a mild curing condition with less thermal stress (at low temperature and/or over a short time). This enables suppression of deformation of the surface structure during the release treatment and thus provides a release liner with a precise surface structure. Moreover, by suppressing the curing inhibition of release agent, the amount of uncured release agent can be reduced so that the resulting PSA sheet exhibits higher adhesive performance. Also, by preventing the insufficient curing of release agent, a desired level of liner-releasing ability can be provided.

Curing of the prescribed release agent can be carried out at a temperature within a range of about 100° C. to 170° C. (more preferably, about 120° C. to 160° C.; for instance, about 130° C. to 150° C.). The release agent can be heated at this temperature, for instance, over about 10 minutes or less (typically, about 10 seconds to 10 minutes) and preferably for about 15 seconds to 5 minutes (e.g., about 30 seconds to 2 minutes).

The amount of release agent (preferably, a prescribed release agent) is not particularly limited and it can be used, for instance, in an amount that a conventional release agent is generally used in release liners. In a preferred embodiment, release agent is used, per 1 m$^2$ of release liner (based on the projected area; i.e., the surface area increased due to the surface contours is not included), in an amount of about 0.05 to 5 g/m$^2$ (for instance, about 0.1 to 1 g/m$^2$) based on the solid content. When the amount of release agent is too low, insufficient release may be provided. When the amount of release agent is too much, a large amount of uncured release agent is likely to remain after the release treatment. In a preferred embodiment, a release agent and its amount to be used as well as the curing condition are selected such that the silicone transfer rate, which is described later, be less than 0.2 mass %. In a release-lined PSA sheet constituted with a release liner with a low silicone transfer rate (less uncured release agent), adhesive performance (e.g., at least one of adhesiveness, cohesiveness, adhesiveness to a curved surface, etc.) can be brought about to a greater extent.

A release liner having the configuration shown in FIG. 1 can be produced by various methods.

In one example, a polyolefin-based (PE-based, PP-based, etc.) resin composition is prepared for the face layer (layer A) and this composition in a heat-melted state is applied in a layer to a surface of a support layer sheet (paper, PET film, etc.) While the composition (extrusion) is solidified by cooling, ridges are formed on the surface by pressing (inline embossing) and the surface is treated with release agent (preferably, a prescribed release agent).

Alternatively, the composition in a melted state can be applied in a layer to a support layer sheet surface and cooled to form a laminate with a flat surface (comprising the support layer sheet and polyolefin-based resin layer) and the polyolefin-based resin layer can be subjected to embossing by heat-pressing to form ridges on the surface (offline embossing) followed by treatment with release agent. Or, the polyolefin-based resin layer of the laminate can be treated on a surface with release agent and subjected to embossing to form ridges on the surface. In the embodiment wherein a release-treated surface is subjected to embossing, surface deformation due to heating in the release treatment can be avoided (thermal stress applied after formation of ridges can be reduced). In addition, the polyolefin-based resin layer can be removed easily from the embossing mold.

As for other production methods, a solution or a dispersion of a face-layer-forming polyolefin-based resin composition in an appropriate solvent can be applied in a layer to a support layer sheet surface and allowed to dry to form a laminate sheet with a flat surface; and the polyolefin-based resin layer of the laminate sheet can be subjected to embossing to form ridges on a surface followed by release treatment; or the resin layer can be subjected to surface release treatment followed by embossing.

For another production method, a support-layer-forming resin composition (for instance, PET) and a face-layer-forming composition can be co-extruded and the extrusion can be pressed with cooling to form ridges on the surface of the layer of the face-layer-forming composition, which in turn can be treated with release agent. Alternatively, a support-layer-forming composition and a face-layer-forming composition can be co-extruded and cooled to form a laminate sheet with a flat surface (comprising a support layer and a polyolefin-based resin layer); and the polyolefin-based resin layer of the laminate sheet can be subjected to embossing followed by release treatment or to release treatment followed by embossing.

A face-layer-forming polyolefin-based resin composition can be molded solely to prepare a polyolefin-based resin film and the resulting film can be laminated onto a support layer sheet (paper, PET film, etc.) to form a laminate; the film surface can be embossed and treated with release agent. Instead, the laminate can be treated on the film surface and subsequently embossed. Alternatively, a first surface of the polyolefin-based resin film can be treated with release agent and a second surface thereof can be embossed while or after it is laminated to a support layer sheet.

Embossing (formation of surface structure) can be carried out at a temperature of for instance, about 190° C. or lower (typically, about 120° C. to 190° C.) when the face layer is formed of PP resin, and is preferred to be about 140° C. to 180° C. in terms of productivity. A face layer of PE resin, for instance, is preferred to be embossed at about 150° C. or lower (typically, about 90° C. to 150° C.; for example, about 110° C. to 130° C.).

The invention disclosed in this description includes a method for producing a release-liner disclosed herein, comprising: preparing a support layer sheet (preferably, of paper, resin film, etc.); laminating a face-layer-forming polyolefin-based resin composition in a layer to at least a first surface of the sheet; embossing ridges on a surface of the layer formed of the polyolefin-based resin composition (polyolefin-based resin layer); and applying a prescribed release agent to the surface with ridges and curing under the preferred conditions (temperature, time duration).

The invention disclosed in the description disclosed herein includes a method for producing a release-liner disclosed herein, comprising: preparing a support layer sheet (preferably, paper, resin film, etc.); laminating a face-layer-forming polyolefin-based resin composition in a layer (a polyolefin-based resin layer) to at least a first surface of the sheet; applying a prescribed release agent to a surface of the layer formed of the polyolefin-based resin composition and curing the agent under preferred conditions (temperature, time duration); and embossing ridges to the release-treated surface.

As for the PSA sheet substrate of the release-lined PSA sheet disclosed herein, can be selected appropriately from, for instance, plastic films such as polypropylene, ethylene-propylene co-polymer, polyester, polyvinyl chloride films, etc.; foams such as polyurethane, polyethylene foams, etc.; papers such as kraft paper, crepe paper, Japanese rice paper (washi), etc.; fabrics such as cotton, staple fiber fabrics, etc.; unwoven fabrics such as polyester, vinylon unwoven fabrics, etc.; metal foils such as aluminum, copper foils, etc.; and the like in accordance with the application of the PSA sheet. The plastic film may be either unstretched or stretched (uniaxially or biaxially stretched). The substrate may be treated on the PSA layer side surface with primer coating, corona discharge, etc. The substrate thickness can be appropriately selected according to the application, but in general, it is about 10 μm to 500 μm (typically, about 10 μm to 200 μm).

The type of PSA to form the PSA layer is not particularly limited. For example, the PSA layer can be formed of one, two or more kinds selected from various known PSAs such as acrylic, polyester-based, urethane-based, polyether-based, rubber-based, silicone-based, polyamide-based, fluorine-based ones, and the like. The form of the PSA is not particularly limited, either. For instance, it may be in various forms such as solvent-type, emulsion-type, aqueous-solution-type, UV-curable-type PSAs and so on. The PSA may contain one, two or more kinds of general additives such as tackifiers, viscosity-modifiers, leveling agents, plasticizers, fillers, colorants such as pigments and dyes, stabilizers, preservatives, anti-aging agents, anti-static agents, etc.

In a preferred embodiment, the PSA layer is formed of an acrylic PSA comprising an acrylic polymer as a base polymer (primary polymer component of the PSA). The acrylic polymer is typically an alkyl (meth)acrylate, i.e., a (co)-polymer of (meth)acrylic acid ester of an alkyl alcohol as a primary monomer. Here, the term "(meth)acrylic acid" encompasses acrylic acid and methacrylic acid. For instance, a preferred PSA layer is formed to contain an acrylic PSA composed of as a primary monomer, an acrylic acid ester of an alkyl alcohol with 2 to 14 carbon atoms (more preferably, 4 to 10 carbon atoms). This PSA layer can be formed of an acrylic PSA composition containing as necessary a tackifier, cross linking agent, solvent, etc in addition to the acrylic (co)-polymer. The PSA layer preferably has a thickness about equal to or greater than the ridge height and it can be for instance about 5 µm to 150 µm (typically, about 10 µm to 100 µml, for example, about 20 µm to 50 µm).

The PSA layer can be formed, for instance, by directly applying (typically by coating) an appropriate PSA composition to a PSA sheet substrate and allowing the applied composition to dry and/or cure as necessary (direct method). To the PSA layer, a release liner can be laminated, by pressing as necessary, to prepare a release-lined PSA sheet having a surface structure corresponding the surface structure of the release liner. Alternatively, the PSA composition can be applied to a release liner (to a surface of layer A) and the applied composition can be allowed to dry and/or cure as necessary to form a PSA layer on the release liner; and a substrate can be laminated to the release liner with the PSA layer to transfer the PSA layer to the substrate to form a release-lined PSA sheet (transfer method). The invention disclosed in this description includes a method for producing a release-lined PSA sheet disclosed herein, comprising: preparing a release liner disclosed herein (can be prepared by a method disclosed herein) and producing by the direct or transfer method a release-lined PSA sheet using this release liner. When the transfer method is used, drying of the PSA composition applied to the release liner can be dried at a temperature of about 140° C. or lower and preferably at about 130° C. or lower (for instance, about 60° C. to 130° C.

EXAMPLES

Hereinafter, some examples according to the present invention will be described, but the present invention is not limited to these specific examples. In the following description, the "part(s)" and "%" are based on mass unless otherwise specified.

Evaluations were carried out as described below.
Thickness and Structure

The thickness of each release liner was measured in µm using a dial gauge with a minimal reading value of ¹/₁₀₀₀ mm.

The thickness of each layer constituting the release layer was determined by analyzing the cross section cut across the width of the liner using a field emission scanning electron microscope (FE-SEM from Hitachi High-Technologies Corporation, product name "S-4800") at ×300 magnification.

The surface structures of the release liner and PSA layer were analyzed with a laser microscope (available from Olympus Corporation, product name "LEXT OLS3000").
Average Linear Expansion Coefficient Each release liner was cut along its length to prepare a strip of 10 mm length and 3 mm width. The test piece was subjected to thermo-mechanical analysis (TMA) to determine the average linear expansion coefficient between 25° C. and 40° C. in ° C. The thermo-mechanical analysis was carried out using a thermal stress strain measurement instrument, model name "EXSTAR6000TMA/SS" available from SII Nano-Technology Inc., under the following conditions:
  measurement mode: extension method
  load: 19.6 mN
  temperature program: increased at a rate of 5° C./min from −20° C. to 100° C.
Air Release Each release liner was cut along its length to prepare a test piece strip of 70 mm length and 25 mm width and the test piece was stored under an atmosphere at 35° C. for 1 hour. Under the atmosphere at 35° C., release liner was removed from the test piece and the exposed PSA layer was bonded to a glass slide of 26 mm width and 76 mm length by pressing with a 2-kg roller with a hole (the roller was wrapped around with a rubber sheet having a hole of 8 mm diameter and 3 mm depth) to intentionally trap an air bubble between the PSA layer and the glass slide.

Bonded areas with no air bubble were observed from the back of the glass slide (opposite to the surface bonded with the test piece) under an optical microscope (from KEYENCE CORPORATION, digital microscope model number "VHX-100F") to determine if grooves (air release channels) are present between the PSA layer and the glass.

Figure 4:
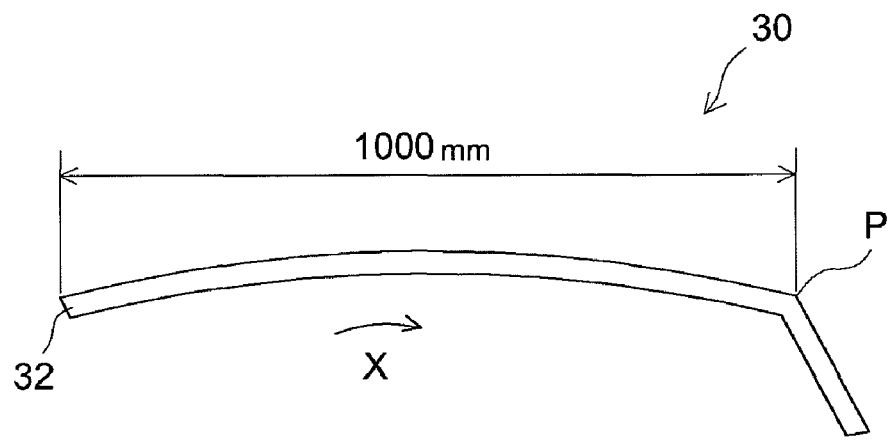
FIG. 4 shows a plain view of an adherend used for evaluation of size stability.
Figure 5:
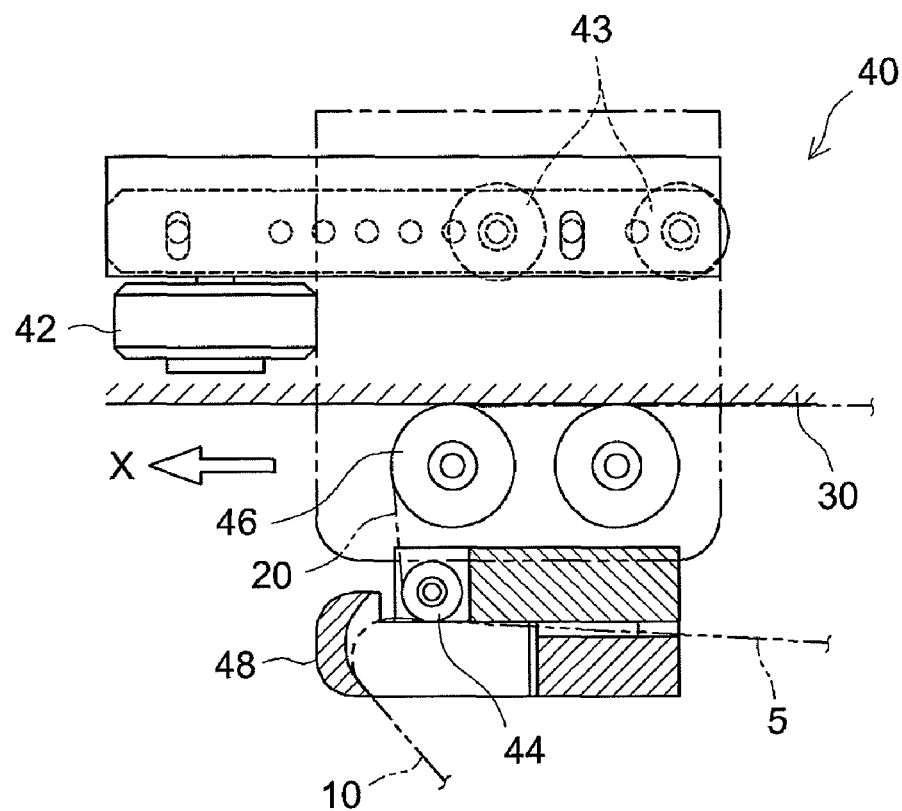
FIG. 5 shows a side view of a bonding device used for evaluation of size stability.

Subsequently, under the atmosphere at 35° C., the test piece with a trapped air bubble was pressed with a 2-kg roller reciprocating back and forth once and the degree of air elimination was observed from the back of the glass slide. Samples were rated from poor to excellent where "P" (poor) was given when elimination of the air bubble was incomplete and "E" (excellent) when there was no remaining air bubble (the air bubble was completely eliminated).
Application Size Stability To be adhered to a vehicle door frame 30 outlined in FIG. 4, each release-lined PSA sheet was cut to prepare a test piece that corresponds to the shape of the adherend door frame 30. The test piece was stored under an atmosphere at 35° C. for 1 hour and the test piece was bonded to the adherend 30 using a bonding device (bonding jig) 40 outlined in FIG. 5 so that a first edge of the test piece was joined with an edge 32 of the adherend 30, with a release liner 10 removed from the test piece 5 and a PSA sheet 20 bonded to the adherend 30 continuously. The bonding device 40 comprises guiding rollers 42 and 43 to allow the device 40 to run in a prescribed position along with the adherend 30, wherein when the device 40 is forwarded (in direction of X in FIG. 5), of the test piece 5 fed from the right side, the PSA sheet 20 is wound up around a sheet supplying roller 44 to be guided to a bonding roller 46 while the release liner 10 is removed from the winding PSA sheet 20 and guided by a liner guide 48 to be fed out from the device 40. On the adherend 30, a projected terminal point (point P) was set at a linear distance of 1000 mm from the edge 32 and the size stability of each sample was evaluated. Samples were rated from poor to excellent where "P" (poor) was given when the terminal end of the bonded PSA sheet reached beyond point P by greater than 1.0 mm; and "E"

(excellent) when the difference between the terminal end of the PSA sheet and point P was at most 1.0 mm. It is noted that each test piece was cut in a size that when bonded in the same way at 25° C., the terminal end of the PSA sheet was at a position within 1.0 mm from point P.

Adhesiveness to a Curved Surface

Figure 6:
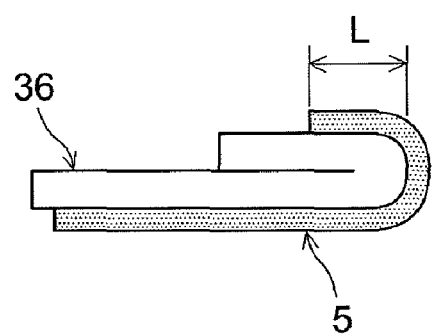
FIG. 6 is a schematic illustration of the method for evaluation adhesiveness to a curved surface.

Each release-lined PSA sheet was cut to prepare a test piece strip of 100 mm length and 30 mm width and the test piece was stored under an atmosphere at 10° C. for 1 hour. As shown in FIG. 6, a standard test plate available from Nippon Testpanel Co., Ltd. (SPCC-SD cold-reduced carbon steel plate of 70 mm length, 150 mm width and 2 mm thickness as prescribed by JIS G 3141) coated on both sides with an acryl melamine-based coating was folded at one end to prepare an adherend (coated steel plate) 36; and under the atmosphere at 10° C., a test piece 5 was bonded to the adherend 36 along the folded part so that the portion that was folded over has a length L of 2 mm. The test piece 5 was pressed to bond with a finger moving back and forth once over the test piece at a speed of 30 m/s The test piece 5 bonded on the adherend 36 was stored under the atmosphere at 10° C. over 3 days and was visually observed for any lifting of the test piece 5 from the adherend 36 to evaluate the adhesiveness to a curved surface (resistance against anti-folding, repulsive power). Samples were rated from poor to excellent where "P" (poor) was given when some lifting was observed and "E" (excellent) when no lifting was observed.

Phosphorous-Based Antioxidant Content

About 0.5 g of each sample (polyolefin-based resin) was weighed out and dissolved in about 10 mL xylene with heating. Antioxidant was extracted with about 80 mL of acetonitrile. The extract was concentrated, diluted with acetonitrile to 10 mL, and filtered through a membrane filter of a pore size of 0.45 μm. The filtrate was analyzed by HPLC (high performance liquid chromatography). From the quantitative analysis, the phosphorous-based antioxidant content of each sample was determined. The HPLC analysis was carried out with "Alliance (registered trademark)" PDA system, a HPLC analyzer available from Waters Corporation under the following conditions:

Column: Waters Xterra MS C18
Column size: 4.6-mm diameter×150 mm
Column temperature: 40° C.
Injection volume: 10 μL
Flow rate: 1.0 mL/min
Detector: PDA (photodiode array detector)

Example 1

Linear low-density polyethylene (LDPE) was laminated by extrusion to form PE layers on both sides of a sheet of high-quality paper with a grammage of 100 g/m². As for the LDPE, was used a product of Sumitomo Chemical Co., Ltd., product name "Sumikathene CE4009" (LDPE free of phosphorous-based antioxidants; hereinafter, this may be referred to as "PE-0"). A triple-layer sheet comprising high-quality paper (support layer) and PE layers on both sides thereof was so obtained. The laminate sheet had a total thickness of 173 μm, of which the support layer accounted for 119 μm and each PE layer for 27 μm.

Subsequently, the surface of a first PE layer was treated with release agent. In particular, a commercially available addition-curable-type silicone-based release agent (containing a platinum catalyst, solvent-free type) was applied to the first PE surface in an amount of about 1.0 g/m² and cured at 125° C. for one minute.

The release-treated surface (PSA layer side) was subjected to heat press to form a grid protrusion comprising first and second ridge groups orthogonally intersecting each other. Ridges in the first and second ridge groups share a common cross section and a common pitch (the same is true with Examples 2 to 25 described later). In this example, the pitch was 1270 μm, the distance LA between two adjacent ridges at the bottoms was 1209 μm, the ridge width LB at the bottom (equivalent to the lower side of the trapezoidal cross section) was 61 μm, and the ridge height LC (equivalent to the trapezoid height) was 22 μm (see FIG. 2). Each of the first and second ridge groups forms an angle of 45° with the length of the release liner. The pressing step was carried out at an upper heater temperature of 100° C., a lower heater temperature of 145° C. and applied pressure of 6 MPa over a pressing time of 5 minutes to obtain a release liner of Example 1.

To this release liner on the PSA layer side, an acrylic PSA composition (a product of Nitto Denko Corporation, a solvent-type PSA composition composed primarily of an acrylic polymer mainly of 2-ethylhexyl acrylate) was applied and allowed to dry at 100° C. for one minute to form a PSA layer on the release liner. The applied amount of the PSA composition was adjusted so that the PSA layer would have a thickness of about 35 μm (thickness as in the adhesive surface 244 shown in FIG. 1). On the other hand, a polypropylene resin sheet of 90 μm thickness was prepared as a PSA sheet substrate and the substrate was adhered to the PSA layer on the release liner to obtain a release-lined PSA sheet of Example 1.

Examples 2 to 6

In each of these examples, the heat-pressing was carried out with an embossing mold having a different structure from Example 1 to form a grid protrusion comprising first and second ridge groups orthogonally intersecting each other, with the ridges having a pitch and cross section dimensions as shown in Table 2. Otherwise, release liners of Examples 2 to 6 were prepared in the same way as Example 1. Using these release liners, release-lined PSA sheets of Examples 2 to 6 were prepared in the same way as Example 1.

Examples 7 to 12

A homo-polypropylene (homo-PP) was laminated by extrusion on both sides of a PET film (Toray Industries, Inc., product name "Lumirror S28") to form PP layers. For the homo-PP, was used a product of Japan Polypropylene Corporation, product name "Novatec FL03H," (homo-PP free of phosphorous-based antioxidant; hereinafter, may be referred to as "PP-0"). A triple-layer sheet comprising a PET film (support layer) and PP layers on both sides thereof was so prepared. The laminate sheet had a total thickness of 160 μm, of which the support layer contributes to 100 μm and each PP layer to 30 μm.

Subsequently, the surface of a first PP layer was treated with release agent. In particular, a commercially available addition-curable-type silicone-based release agent (containing a platinum catalyst, solvent-free type) was applied to the first PP surface in an amount of about 0.3 to 0.5 g/m²; and dried and cured at 145° C. for one minute.

The release-treated surface was subjected to heat-press to form a grid protrusion comprising first and second ridge groups orthogonally intersecting each other, with the ridges having a pitch and cross section dimensions as shown in Table 2. The pressing step was carried out at an upper heater temperature of 160° C., a lower heater temperature of 165° C. and applied pressure of 6 MPa over a pressing time of 5 minutes to obtain release liners of Example 7 to 12. Using these release liners, release-lined PSA sheets of Examples 7 to 12 were prepared in the same way as Example 1.

Examples 13 to 15

A random polypropylene containing 0.04% phosphorous-based antioxidant (Japan Polypropylene Corporation, product name "Novatec FY4"; hereinafter, may be referred to as "PP-2") was supplied to an extruder and extruded from its T-die at a temperature of 240° C. The extrusion was fed and cooled between a pair of cooling rollers to form a sheet of about 170 μm thickness. Subsequently, a first surface of each PP sheet was treated with release agent. In particular, the first surface was coated with the same silicone-based release agent as the one used in Example 7 in an amount of about 0.3 to 0.5 g/m² based on the solid content; and dried and cured at 145° C. for one minute.

The release-treated surface was subjected to heat-press to form a grid protrusion comprising first and second ridge groups orthogonally intersecting each other, with the ridges having a pitch and cross section dimensions as shown in Table 2. The pressing step was carried out at an upper heater temperature of 160° C., a lower heater temperature of 175° C. and applied pressure of 6 MPa over a pressing time of 10 minutes to obtain release liners of Example 13 to 15. Using these release liners, release-lined PSA sheets of Examples 13 to 15 were prepared in the same way as Example 1.

Examples 16 to 18

In each of these examples, in place of the random polypropylene used in the formation of PP sheets in Examples 13 to 15, was used a random polypropylene containing 0.08% phosphorous-based antioxidant (Japan Polypropylene Corporation, product name "Novatec FY6"; hereinafter, may be referred to as "PP-3"). A first surface of the PP sheet was release-treated in the same way as Example 13. The release-treated surface was subjected to the same heat press procedures as Example 13 to form a grid protrusion comprising first and second ridge groups orthogonally intersecting each other, with the ridges having a pitch and cross section dimensions as shown in Table 2. Otherwise, release liners of Examples 16 to 18 were prepared in the same way as Example 13. Using these release liners, release-lined PSA sheets of Examples 16 to 18 were prepared in the same way as Example 1.

Examples 19 to 21

In each of these examples, in place of the random polypropylene used in the formation of PP sheets in Examples 13 to 15, was used a random polypropylene containing 0.08% phosphorous-based antioxidant and a nucleating agent (Japan Polypropylene Corporation, product name "Novatec FY6C"; hereinafter, may be referred to as "PP-4"). A first surface of each PP sheet was release-treated in the same way as Example 13. The release-treated surface was subjected to the same heat press procedures as Example 13 to form a grid protrusion comprising first and second ridge groups orthogonally intersecting each other, with the ridges having a pitch and cross section dimensions as shown in Table 2. Otherwise, release liners of Examples 19 to 21 were prepared in the same way as Example 13. Using these release liners, release-lined PSA sheets of Examples 19 to 21 were prepared in the same way as Example 1.

Table 1 shows the release liner configuration, type of material of the release-treated surface, pitch and cross section dimensions of ridges formed on the PSA layer side surface of the release liner for Examples 1 to 21.

TABLE 1

| Example | Liner Configuration | Treated Surface | Pitch (μm) | LA (μm) | LB (μm) | LC (μm) |
|---|---|---|---|---|---|---|
| 1 | PE/paper/PE | PE-0 | 1270 | 1209 | 61 | 22 |
| 2 | PE/paper/PE | PE-0 | 770 | 627 | 143 | 20 |
| 3 | PE/paper/PE | PE-0 | 620 | 550 | 70 | 25 |
| 4 | PE/paper/PE | PE-0 | 670 | 600 | 70 | 25 |
| 5 | PE/paper/PE | PE-0 | 870 | 800 | 70 | 25 |
| 6 | PE/paper/PE | PE-0 | 580 | 550 | 30 | 15 |
| 7 | PP/PET/PP | PP-0 | 1270 | 1209 | 61 | 22 |
| 8 | PP/PET/PP | PP-0 | 770 | 627 | 143 | 20 |
| 9 | PP/PET/PP | PP-0 | 620 | 550 | 70 | 25 |
| 10 | PP/PET/PP | PP-0 | 670 | 600 | 70 | 25 |
| 11 | PP/PET/PP | PP-0 | 870 | 800 | 70 | 25 |
| 12 | PP/PET/PP | PP-0 | 580 | 550 | 30 | 15 |
| 13 | PP monolayer | PP-2 | 500 | 430 | 70 | 25 |
| 14 | PP monolayer | PP-2 | 620 | 550 | 70 | 25 |
| 15 | PP monolayer | PP-2 | 580 | 550 | 30 | 15 |
| 16 | PP monolayer | PP-3 | 500 | 430 | 70 | 25 |
| 17 | PP monolayer | PP-3 | 620 | 550 | 70 | 25 |
| 18 | PP monolayer | PP-3 | 580 | 550 | 30 | 15 |
| 19 | PP monolayer | PP-4 | 500 | 430 | 70 | 25 |
| 20 | PP monolayer | PP-4 | 620 | 550 | 70 | 25 |
| 21 | PP monolayer | PP-4 | 580 | 550 | 30 | 15 |

Figure 3:
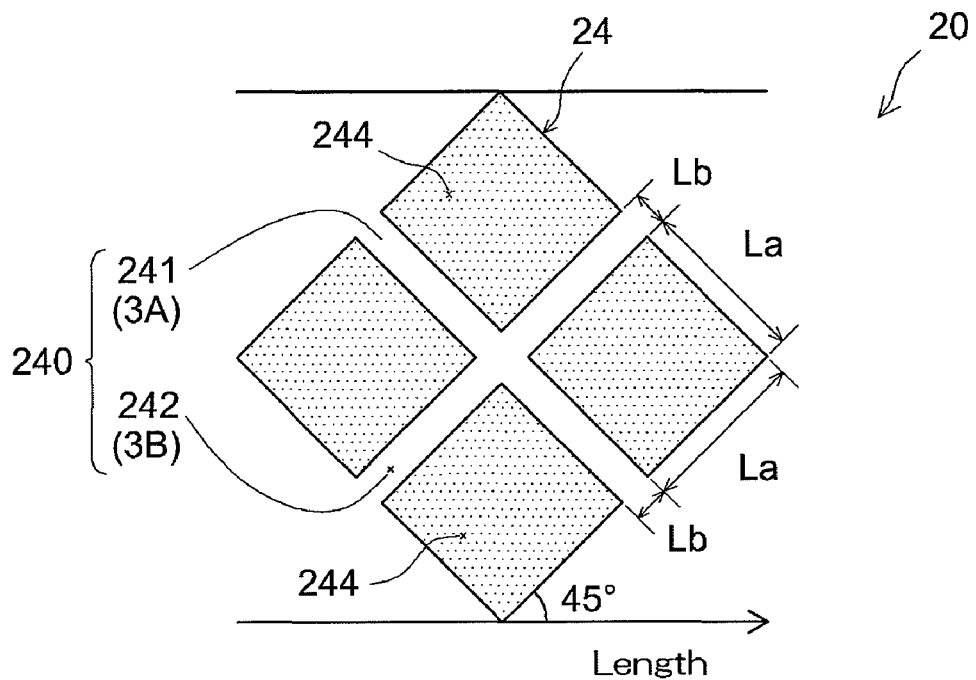
FIG. 3 shows a plain view of a PSA layer schematically illustrating a pattern of PSA sections and structural parts for physical measurements.

LA: distance between adjacent ridges at the bottoms
LB: ridge width at the bottom
LC: ridge height Release-lined PSA sheets of Examples 1 to 21 were measured for the distance La between two adjacent grooves at the openings, the groove width Lb at the opening and the groove depth Lc (see FIG. 3). Each sample was evaluated also for the average linear expansion coefficient of its release liner as well as the air release and size stability of the sheet upon the application. Table 2 shows the results along with the release liner configuration of each example.

TABLE 2

| | Release liner | | Surface structure of PSA layer | | | | | Adhesiveness |
|---|---|---|---|---|---|---|---|---|
| Ex. | Configuration | α (/° C.) | La (μm) | Lb (μm) | Lc (μm) | Air release | Size stability | to curved surface |
| 1 | PE/paper/PE | 3.4 × 10⁻⁵ | 1211 | 65 | 25 | E | high | E |
| 2 | PE/paper/PE | 3.4 × 10⁻⁵ | 631 | 143 | 24 | E | high | E |
| 3 | PE/paper/PE | 3.4 × 10⁻⁵ | 555 | 74 | 34 | E | high | E |
| 4 | PE/paper/PE | 3.4 × 10⁻⁵ | 600 | 71 | 27 | E | high | E |
| 5 | PE/paper/PE | 3.4 × 10⁻⁵ | 801 | 73 | 28 | E | high | E |
| 6 | PE/paper/PE | 3.4 × 10⁻⁵ | 554 | 35 | 21 | E | high | E |
| 7 | PP/PET/PP | 3.3 × 10⁻⁵ | 1211 | 65 | 25 | E | high | E |
| 8 | PP/PET/PP | 3.3 × 10⁻⁵ | 631 | 143 | 24 | E | high | E |
| 9 | PP/PET/PP | 3.3 × 10⁻⁵ | 555 | 74 | 34 | E | high | E |
| 10 | PP/PET/PP | 3.3 × 10⁻⁵ | 600 | 71 | 27 | E | high | E |

TABLE 2-continued

| | Release liner | | Surface structure of PSA layer | | | | | Adhesiveness |
|---|---|---|---|---|---|---|---|---|
| Ex. | Configuration | α (/° C.) | La (μm) | Lb (μm) | Lc (μm) | Air release | Size stability | to curved surface |
| 11 | PP/PET/PP | 3.3 × 10$^{-5}$ | 801 | 73 | 28 | E | high | E |
| 12 | PP/PET/PP | 3.3 × 10$^{-5}$ | 554 | 35 | 21 | E | high | E |
| 13 | PP monolayer | 17 × 10$^{-5}$ | 430 | 70 | 25 | E | low | P |
| 14 | PP monolayer | 17 × 10$^{-5}$ | 555 | 74 | 34 | E | low | E |
| 15 | PP monolayer | 17 × 10$^{-5}$ | 554 | 35 | 21 | E | low | E |
| 16 | PP monolayer | 17 × 10$^{-5}$ | 430 | 70 | 25 | E | low | P |
| 17 | PP monolayer | 17 × 10$^{-5}$ | 555 | 74 | 34 | E | low | E |
| 18 | PP monolayer | 17 × 10$^{-5}$ | 554 | 35 | 21 | E | low | E |
| 19 | PP monolayer | 17 × 10$^{-5}$ | 430 | 70 | 25 | E | low | P |
| 20 | PP monolayer | 17 × 10$^{-5}$ | 555 | 74 | 34 | E | low | E |
| 21 | PP monolayer | 17 × 10$^{-5}$ | 554 | 35 | 21 | E | low | E |

La: distance between adjacent grooves at the openings
Lb: width of groove opening
Lc: groove depth
α: average linear expansion coefficient between: 25° C. and 40° C.

As shown in Table 2, every release-lined PSA sheet of Examples 1 to 12, despite of each section (portion 124 in FIG. 1) of the release liner and the corresponding bonding area of the PSA sheet extending beyond a frame having an inscribed circle of 500 μm diameter (i.e., having a larger continuous bonding area), exhibited excellent air release even in a relatively high temperature environment (35° C. in these cases). These results support that because of the reduced thermal stress applied after the formation of ridges on the PSA layer side surface, the resulting release liner had a highly precise surface structure and this precise structure provided the associated PSA layer with corresponding precise grooves (air release channels). In every release-lined PSA sheet of Examples 1 to 12, the surrounding temperature scarcely affected the application size (indicating high size stability) and the sheet maintained excellent workability over a wide range of temperatures.

On the other hand, samples of Examples 13 to 21, with each release liner having a high average linear expansion coefficient, the PSA sheet exhibited low size stability and showed a tendency to expand beyond the prescribed size at a higher application temperature, indicating poor workability in a high temperature environment.

Furthermore, PSA sheets of Examples 1 to 12, 14, 15, 17, 18, 20 and 21 showed greater adhesiveness to a curved surface as compared to those of Examples 13, 16 and 19. These results support that a PSA sheet with larger continuous bonding areas brings about higher adhesive performance as compared to a PSA sheet with more fragmented bonding areas.

The following experiments were conducted to elucidate the relationship between the phosphorous-based antioxidant content and the curing efficiency of the release agent.

Example 22

PP-4 and LDPE were mixed at a mass ratio of 100 to 10 to prepare a support-layer-forming PP resin composition (a1). A face-layer forming PP resin composition (b1) was prepared by mixing at a ratio of 100 to 10, a face-layer-forming PP resin composition containing 0.005% phosphorous-based antioxidant (product name "Novatec FB3C"; hereinafter may be referred to as "PP-1") and LDPE. These compositions a1 and b1 were molded into a bi-layer PP resin sheet by co-extrusion (two-color extrusion). In particular, compositions a1 and b1 were supplied to an extruder for two-color molding and heat-melted compositions a1 and b1 were extruded into individual layers from a T-die of the extruder (with a die temperature of 240° C.). The extruder was set so that the extruded volumes of these compositions were 8 to 1 (a1:b1). The extrusion was molded into a sheet of 170 μm thickness while fed and cooled between a processing roller (cooling roller) having a grid recess on the surface and a pressing roller (cooling roller) with a smooth surface. The cooling and molding were carried out such that composition b1 of the extrusion was on the processing roller side and compositional on the pressing roller side to obtain a bi-layer PP resin sheet comprising: a face layer formed of composition b1 with the layer comprising a grid protrusion transferred by the surface structure of the processing roller and a support layer formed of compositional.

Of the obtained PP sheet, the surface having the grid protrusion was coated with the same release agent as the one in Example 7 in an amount based on the solid content of about 0.3 to 0.5 g/m$^2$; and the coat was dried and cured at 145° C. for one minute to obtain a release liner.

The resulting release liner had a total thickness of 170 μm, of which the support layer accounted for 135 μm. The grid protrusion comprised first and second ridge groups orthogonally intersecting each other with each group making a 45° angle with the length of the release liner. Ridges of both the first and second groups had a trapezoidal cross section with a lower side of 68 μm, an upper side of 10 μm and a height of 25 μm with a pitch (interval between two adjacent ridges) of 500 μm.

A first side of a polypropylene-based resin sheet (PSA sheet substrate) of 90 μm thickness was coated with an acrylic PSA (Nitto Denko Corporation, a 2-ethylhexyl acrylate-based solvent-type PSA) and dried at 100° C. for one minute to form a PSA layer of 35 μm dry thickness. The PSA layer of the resulting PSA sheet was adhered to the release liner and pressed with applied pressure of 0.4 N/mm$^2$ at a temperature of 23° C. for 5 minutes to prepare a release-lined PSA sheet of Example 22.

Example 23

PP-2 and LPDE were mixed at a mass ratio of 100 to 10 to prepare a face-layer forming PP resin composition (b2). Except for that composition b2 was used in place of composition b1 in Example 22, in the same way as Example 22, was obtained a bi-layer PP resin sheet comprising a face layer formed of composition b2 and a support layer formed of compositional. The resulting sheet was release-treated in the same way as Example 22 to form a release liner. This release liner was pressed over a PSA layer formed on a substrate in the same way as Example 22 to obtain a release-lined PSA sheet of Example 23.

Example 24

PP-3 and LDPE were mixed at a ratio of 100 to 10 to prepare a face-layer forming PP resin composition (b3). Except for that composition b3 was used in place of composition b1 in Example 22, in the same way as Example 22, was obtained a bi-layer PP resin sheet comprising a face layer formed of composition b3 and a support layer formed of compositional. The resulting sheet was release-treated in the same way as Example 22 to form a release liner. This release liner was pressed over a PSA layer formed on a substrate in the same way as Example 22 to obtain a release-lined PSA sheet of Example 24.

Example 25

In this example, a PP resin sheet was prepared entirely from compositional, which was used to form a support layer in Example 22. In particular, compositional was supplied to an extruder and extruded at a die-temperature of 240° C. The extrusion was cooled and molded simultaneously in the same way as Example 22 to prepare a PP resin sheet provided with a grid protrusion on one surface. This PP resin sheet surface was release-treated in the same way as Example 22 to obtain a release liner. This release liner was pressed over a PSA layer formed on a substrate in the same way as Example 22 to obtain a release-lined PSA sheet of Example 25.

Release liners of Examples 22 to 25 were evaluated for curing efficiencies as described below.

After each release liner was prepared (prior to adhering it to a PSA layer), the amount of silicon (Si) atom present in the release-treated surface was determined by a X-ray fluorescence (XRF) spectrometer (Rigaku Corporation, product name "ZSX100e"). The amount of Si atom was converted to the mass of dimethyl siloxane to determine the amount of coated release agent. Separately, release liner was removed from each release-lined PSA sheet to expose the PSA layer, which was analyzed to determine the amount of Si atom present in the exposed PSA layer in the same way as above. The amount of Si atom was converted to the mass of dimethyl siloxane to determine the amount of silicone transferred to the PSA layer. The amount of transferred silicone was divided by the amount of coated release agent to determine the silicone transfer rate.

Figure 7:
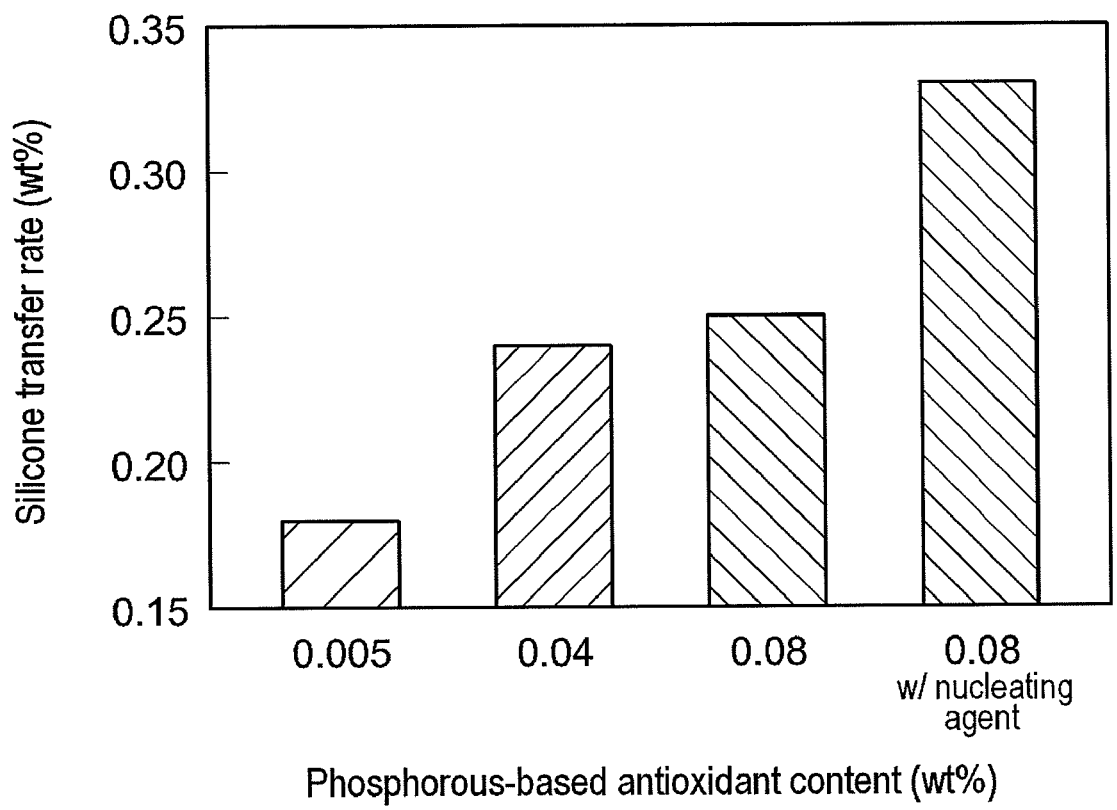
FIG. 7 shows a relationship between the phosphorous-based antioxidant content and the silicone transfer rate.

The results are shown in Table 3 and FIG. 7. Table 3 also includes the type of PP resin used to form each face layer, the phosphorous-based antioxidant content and presence/absence of nucleating agent. It can be said that the lower the silicone transfer rate, the higher the curing efficiency (the less the uncured agent). Curing efficiencies were rated from low to high where "low" was given when the silicone transfer rate was 0.2% or greater and "high" was given when the rate was less than 0.2%.

As shown in Table 3 and FIG. 7, in the release liner of Example 22, wherein a PP resin with at most 0.01% phosphorous-based antioxidant was used to prepare the face-layer-forming PP resin composition, curing of release agent was clearly more efficient as compared to release liners prepared with a PP resin with a higher phosphorous-based antioxidant content (PP-2, PP-3) or with a PP resin containing a higher amount of phosphorous-based antioxidant as well as nucleating agent (PP-4). For example, the silicone transfer rate in Example 22 was reduced by at least 20% (25 to 45%) as compared to Examples 23 to 25. In other words, in release liners of Examples 23 to 25, curing of release agent was not sufficient (enough to suppress the silicone transfer rate below 0.2%) under the above condition while in the release liner of Example 22, curing was sufficient under the same condition (with less thermal stress). These results support that with the phosphorous-based antioxidant content being at most 0.01%, curing of the release agent can be carried out under a condition with less thermal stress and thus deformation of the surface structure (further, a decrease in the structural precision) during the release treatment can be reduced. Moreover, they support that this face layer composition suppresses curing inhibition to provide a release liner with a low silicone transfer rate.

As described above, the release-lined PSA sheet of the present invention ensures excellent air release upon application of the PSA sheet without excessive fragmentation of the PSA layer surface. Hence, the PSA sheet exhibits excellent adhesive performance (adhesiveness to a curved surface, etc.). Furthermore, the release liner has a small average linear expansion coefficient to provide excellent air release over a wide range of temperatures and with a PSA sheet with this release liner, the application size of the PSA sheet is scarcely affected by the application temperature. Thus, the PSA sheet can be easily applied to properly fit in a prescribed-sized area. This release-lined PSA sheet is useful for various decorations and surface protections and for instance, can be suitably used as a decorative sheet (typically as a paint replacement sheet) to be applied to vehicle exteriors and housing materials. Decorative sheets are required to have high aesthetic quality and further to provide excellent air release and high size stability even in a high temperature environment because the temperature in a working environment can be relatively high (for instance, 30 to 35° C.) such as in a factory in the summer. The release-lined PSA sheet disclosed herein is suitable not only for manual applications, but also for applications carried out with a bonding device (such as device 40 shown in FIG. 5) wherein removal of release liner from a PSA sheet and bonding of the PSA sheet to an adherend take place continuously.

What is claimed is:

1. A pressure-sensitive adhesive sheet with a release liner, comprising a pressure-sensitive adhesive sheet comprising a substrate and a pressure-sensitive adhesive layer retained by the substrate, and

TABLE 3

| Ex. | PP resin | Antioxidant (wt %) | Presence of nucleating agent | Amount of release agent coat (g/m$^2$) | Amount of transferred silicone (mg/m$^2$) | Silicone transfer rate (wt %) | Curing of release agent |
|---|---|---|---|---|---|---|---|
| 22 | PP-1 | 0.005 | no | 0.34 | 0.6 | 0.18 | high |
| 23 | PP-2 | 0.04 | no | 0.37 | 0.9 | 0.24 | low |
| 24 | PP-3 | 0.08 | no | 0.40 | 1.0 | 0.25 | low |
| 25 | PP-4 | 0.08 | yes | 0.49 | 1.6 | 0.33 | low | a release liner placed on the pressure-sensitive adhesive layer, wherein:

the release liner has a laminate configuration comprising at least (i) a face layer A to constitute a surface on the pressure-sensitive adhesive layer side and (ii) a support layer B to support the face layer A, the face layer A is formed of a polypropylene resin composition containing no or at most 0.01 mass % of a phosphorous-based antioxidant, which polypropylene resin composition comprises a mixture of a propylene-based polymer and an ethylene-based polymer, the amount of the ethylene-based polymer relative to 100 parts by mass of propylene-based polymer is 5 to 20 parts by mass, the propylene-based polymer is homopropylene and the ethylene-based polymer is low density polyethylene, the face layer A is treated with an addition-curable silicone-based release agent containing a platinum catalyst, the support layer B is formed of paper or a polyethylene-phthalate-based resin, the surface on the pressure-sensitive adhesive layer side is divided into a plurality of sections by a plurality of ridges of 5 μm to 50 μm in height extending across the surface, with at least one of the sections inscribing a circle of a diameter greater than 500 μm, and the release liner has an average linear expansion coefficient of at most $3.4 \times 10^{-5}/°$ C. between 25° C. and 40° C.

2. The pressure-sensitive adhesive sheet with a release liner of claim 1, wherein the plurality of ridges comprise a first group of ridges extending in parallel to each other and a second group of ridges extending in parallel to each other while intersecting the first group; and two adjacent ridges in either of the first and second groups are separated at a pitch exceeding 500 μm at the bottoms.

3. The pressure-sensitive adhesive sheet with a release liner of claim 2, wherein two adjacent ridges in either of the first and second groups have an interval of 550 μm to 1209 μm at the bottoms.

4. The pressure-sensitive adhesive sheet with a release liner of claim 1, wherein each ridge has a width of 15 μm to 200 μm at the bottom.

5. The pressure-sensitive adhesive sheet with a release liner of claim 1, wherein the face layer A formed of a polypropylene resin composition is laminated on at least a first side of the support layer B.

6. The pressure-sensitive adhesive sheet with a release liner of claim 1, wherein the polypropylene resin composition contains essentially no other polymer components.

7. The pressure-sensitive adhesive sheet with a release liner of claim 1, wherein the low density polyethylene is linear low density polyethylene.

8. The pressure-sensitive adhesive sheet with a release liner of claim 1, wherein each ridge has a width of 30 μm to 143 μm at the bottom.

9. The pressure-sensitive adhesive sheet with a release liner of claim 1, wherein the ridge height is 15 μm to 25 μm.

10. The pressure-sensitive adhesive sheet with a release liner of claim 1, wherein the release liner has a triple-layer configuration.

11. A pressure-sensitive adhesive sheet with a release liner, comprising a pressure-sensitive adhesive sheet comprising a substrate and a pressure-sensitive adhesive layer retained by the substrate, and a release liner placed on the pressure-sensitive adhesive layer, wherein:

the release liner has a laminate configuration comprising at least (i) a face layer A to constitute a surface on the pressure-sensitive adhesive layer side and (ii) a support layer B to support the face layer A, the face layer A is formed of a polyolefin-based resin composition containing no or at most 0.01 mass % of a phosphorous-based antioxidant, and a base polymer of the polyolefin-based resin composition is a polyolefin-based resin selected from a linear low density polyethylene or homopolypropylene, the face layer A is treated with an addition-curable silicone-based release agent containing a platinum catalyst, the support layer B is formed of paper or a polyethylene-phthalate-based resin, the surface on the pressure-sensitive adhesive layer side is divided into a plurality of sections by a plurality of ridges of 5 μm to 50 μm in height extending across the surface, with at least one of the sections inscribing a circle of a diameter greater than 500 μm, and the release liner has an average linear expansion coefficient of at most $3.4 \times 10^{-5}/°$ C. between 25° C. and 40° C.

12. The pressure-sensitive adhesive sheet with a release liner of claim 11, wherein the plurality of ridges comprise a first group of ridges extending in parallel to each other and a second group of ridges extending in parallel to each other while intersecting the first group; and two adjacent ridges in either of the first and second groups are separated at a pitch exceeding 500 μm at the bottoms.

13. The pressure-sensitive adhesive sheet with a release liner of claim 12, wherein two adjacent ridges in either of the first and second groups have an interval of 550 μm to 1209 μm at the bottoms.

14. The pressure-sensitive adhesive sheet with a release liner of claim 13, wherein each ridge has a width of 30 μm to 143 μm at the bottom.

15. The pressure-sensitive adhesive sheet with a release liner of claim 14, wherein the ridge height is 15 μm to 25 μm.

16. The pressure-sensitive adhesive sheet with a release liner of claim 15, wherein the release liner has a triple-layer configuration.

17. The pressure-sensitive adhesive sheet with a release liner of claim 11, wherein each ridge has a width of 30 μm to 143 μm at the bottom.

18. The pressure-sensitive adhesive sheet with a release liner of claim 11, wherein the ridge height is 15 μm to 25 μm.

19. A pressure-sensitive adhesive sheet with a release liner, comprising a pressure-sensitive adhesive sheet comprising a substrate and a pressure-sensitive adhesive layer retained by the substrate, and a release liner placed on the pressure-sensitive adhesive layer, wherein:

the release liner has a triple-layer configuration comprising at least (i) a face layer A to constitute a surface on the pressure-sensitive adhesive layer side and (ii) a support layer B to support the face layer A, the face layer A is formed of a polyolefin-based resin composition containing no or at most 0.01 mass % of a phosphorous-based antioxidant, and a base polymer of the polyolefin-based resin composition is a polyolefin-based resin selected from a linear low density polyethylene or homopolypropylene, the face layer A is treated with an addition-curable silicone-based release agent containing a platinum catalyst, the support layer B is formed of paper or a polyethylene-phthalate-based resin, the surface on the pressure-sensitive adhesive layer side is divided into a plurality of sections by a plurality of ridges of 15 μm to 25 μm in height extending across the surface, with at least one of the sections inscribing a circle of a diameter greater than 500 μm, and the release liner has an average linear expansion coefficient of at most $3.4 \times 10^{-5}/°C$. between 25° C. and 40° C., and the plurality of ridges comprise a first group of ridges extending in parallel to each other and a second group of ridges extending in parallel to each other while intersecting the first group, and two adjacent ridges in either of the first and second groups have an interval of 550 μm to 1209 μm at the bottoms, and each ridge has a width of 30 μm to 143 μm at the bottom.

* * * * *